July 15, 1958

E. J. H. BUSSARD ET AL

ULTRA-HIGH-FREQUENCY CONVERTER FOR VERY-HIGH-FREQUENCY TELEVISION RECEIVER

Original Filed Oct. 18, 1951

2,843,828

INVENTORS.
EMMERY J. H. BUSSARD.
REUBEN NATHAN.
BY Alden D. Redfield
Charles M. Hogan
ATTORNEYS.

United States Patent Office 2,843,828

Patented July 15, 1958

2,843,828

ULTRA-HIGH-FREQUENCY CONVERTER FOR VERY-HIGH-FREQUENCY TELEVISION RECEIVER

Emmery J. H. Bussard and Reuben Nathan, Cincinnati, Ohio, assignors to Avco Manufacturing Corporation, Cincinnati, Ohio, a corporation of Delaware Original application October 18, 1951, Serial No. 251,864, now Patent No. 2,763,776, dated September 18, 1956. Divided and this application October 29, 1952, Serial No. 319,622

3 Claims. (Cl. 333—73)

The present invention relates to ultra-high-frequency (U. H. F.) converters for television receivers. A U. H. F. converter is a device which selects the radio frequency carrier signals in the desired U. H. F. channel, converts them into first intermediate frequency (I. F.) carrier signals in the very-high-frequency (V. H. F.) range, and then applies the first I. F. output signals to the V. H. F. signal input circuit of a television receiver tuner. A V. H. F. tuner is a unit included in the receiver, comprising preselector circuits, a local oscillator and a mixer functioning cooperatively to select carrier frequency signals in the desired V. H. F. channel, to convert them into intermediate frequency signals (referred to as "second I. F. signals" when a converter is used), and to apply those I. F. signals to the conventional intermediate frequency amplifier stages of the receiver. When a U. H. F. converter is used in conjunction with a V. H. F. tuner the selector circuits of the V. H. F. tuner are adjusted to receive the V. H. F. signal output of the converter, and the receiver and converter function together as a double superheterodyne receiver.

Subject matter disclosed but not claimed herein is disclosed and claimed in United States Patent 2,763,776, of which the instant application is a division, and in a second divisional application which was filed December 15, 1953, and bears Serial No. 406,034.

In the illustrative U. H. F. converter herein shown, the frequency of the local oscillator is lower than the frequency of the U. H. F. signal input to the converter, this tuner being intended for use with a receiver having a non-symmetrical intermediate frequency system and a local oscillator operating at higher frequencies than that of the V. H. F. input to the receiver proper. Provision is made in this manner for correct presentation of signals to the intermediate frequency system included in the receiver. In the alternative, when a converter is employed with a receiver in which the local oscillator frequency is lower than the frequencies of the V. H. F. input to the receiver, then the frequency of the local oscillator included in the convertor should be made higher than that of the U. H. F. signal input to the converter.

At the present time channels Nos. 2 through 13 are available in the United States for commercial video broadcasting, with V. H. F. channel frequency allocations as follows:

| Channel No. | Megacycles |
|---|---|
| 2 | 54–60 |
| 3 | 60–66 |
| 4 | 66–72 |
| 5 | 76–82 |
| 6 | 82–88 |
| 7 | 174–180 |
| 8 | 180–186 |
| 9 | 186–192 |
| 10 | 192–198 |
| 11 | 198–204 |
| 12 | 204–210 |
| 13 | 210–216 |

The complete V. H. F. range comprises a lower V. H. F. band (54–88 megacycles) and an upper V. H. F. band (174–216 megacycles). In the preferred embodiment of the present invention, this factor is exploited to great advantage, the first I. F. output signal frequencies of the converter being in the portion of the spectrum between those two bands. This portion is not used at any place in the United States for video broadcasting.

The present invention generically embraces, but is not specifically limited to, a converter having a V. H. F. signal output frequency within one of the present V. H. F. channels. A converter which is so limited is designed for a very wide bandwidth to provide output I. F. frequencies covering two adjacent V. H. F. channels, so that an alternate channel may be used for U. H. F. reception if the other V. H. F. channel is assigned to the location where the converter is installed. Prior art converters which provide a V. H. F. signal output frequency within the present V. H. F. channels are subject to a further limitation, even when designed to provide output frequencies covering two adjacent V. H. F. channels, because they do not operate in a satisfactory manner in areas wherein both channels are used for V. H. F. reception. Prior art tuners of this character may be tuned to provide output frequencies within either of two present V. H. F. channels. The present invention affords a very significant advantage in that a V. H. F. selector used in conjunction with our novel converter may be adjusted to receive I. F. signals at any point within the receiver pass band, and such selector is not limited to two positions.

The preferred embodiment of the present invention has a narrower bandwidth and is advantageously used with a continuous type of V. H. F. tuner, the output I. F. frequencies being in the portion of the spectrum between the V. H. F. bands, the portion being covered by continuous V. H. F. tuners but not by step-by-step tuners. It is, accordingly, an object of the preferred form of the invention to provide:

First, a converter having a narrower output bandwidth;

Second, a converter which can universally be used with continuous tuners;

Third, a converter which provides output carrier signals in the portion of the spectrum between the V. H. F. bands;

Fourth, a converter which does not require a range of output frequencies covering two adjacent V. H. F. frequencies; and Fifth, a converter having enhanced gain, signal-to-noise ratio and selectivity characteristics.

The Federal Communications Commission presently contemplates the allocation of carrier frequencies from 470 to 890 megacycles to television broadcast transmission and proposes to add to the present V. H. F. channels a total of 70 additional channels, Nos. 14 through 83, comprising the U. H. F. band or range. Upon the completion and final adoption of this allocation plan or a similar proposal, commercially successful television receivers will require:

A combined U. H. F.-V. H. F. tuner for the selection of any one of the very large number of channels within the U. H. F. and V. H. F. ranges, or A U. H. F. converter in combination with a V. H. F. receiver.

U. H. F. converters will then be required in large numbers to adapt V. H. F. receivers to U. H. F. reception. The preferred type of converter in accordance with the invention will have V. H. F. output frequencies between the V. H. F. bands. Other converters, including a modified form in accordance with the invention, will have V. H. F output frequencies in one of the present V. H. F. channels.

Other important objects of the invention are to provide:

First, a continuously tuned U. H. F. converter for V. H. F. television receivers, specifically a continuously variable tuned U. H. F. converter which is particularly effective in adapting certain makes of existing V. H. F. receivers to U. H. F. reception;

Second, a converter requiring a minimum of circuit alignments;

Third, a converter characterized by high attenuation of and discrimination against undesired signals and spurious responses:

Fourth, a U. H. F. converter having such a low noise characteristic that voltage amplification is obtained at frequencies which simplify design;

Fifth, a converter which exploits the advantages of U. H. F. tuning lines;

Sixth, a converter which features simple antenna and preselector couplings, affording uniform bandpass and efficient power transfer;

Seventh, a converter of economical, compact construction;

Eighth, a converter which may readily and with facility be added to a V. H. F. television installation;

Ninth, a converter which features novel double-tuned bandpass selector and local oscillator circuits;

Tenth, a converter which minimizes oscillator radiation.

Eleventh, a converter with a good output signal-to-noise ratio;

Twelfth, a converter which produces output signals on the order of 127.5 megacycles, the practical ideal value;

Thirteenth, a converter which may have a relatively narrow bandpass;

Fourteenth, a converter having selector circuits which are easily ganged and adjusted for tracking;

Fifteenth, a converter in which a single control element provides both gross and fine adjustments;

Sixteenth, a converter having a response characteristic of proper symmetry with respect to the center frequency of the channel, for any one of the large number of proposed U. H. F. channels.

For a better understanding of the invention, together with other and further objects, advantages, and capabilities thereof, reference is made to the following description of the accompanying drawings, in which there is shown an antenna input and preselector in accordance with the invention:

Figures 1, 2, 3, 4:
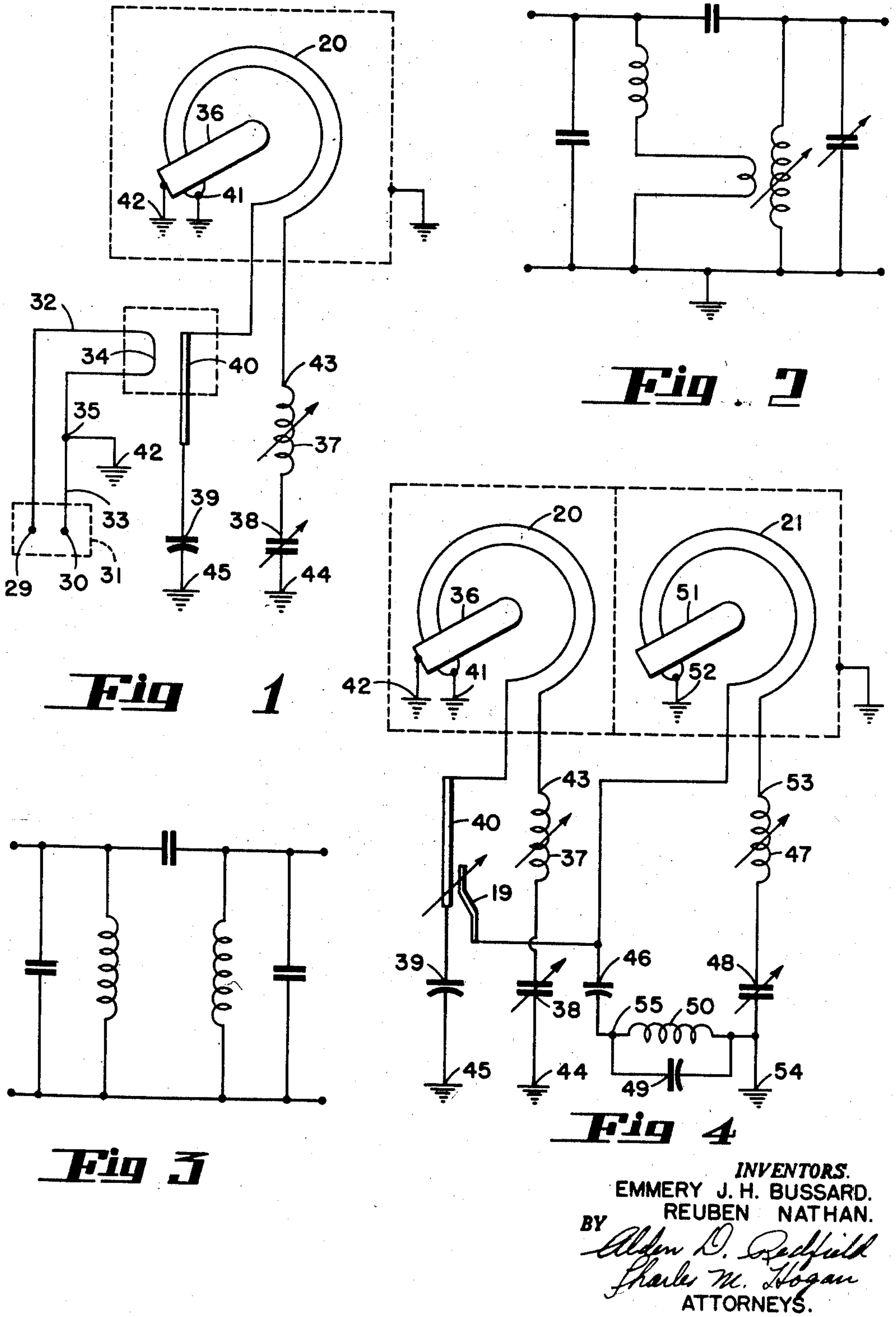
Fig. 1 is a schematic circuit diagram of the antenna coupling circuit included in the converter.
Fig. 2 is an equivalent circuit diagram used as an aid in explaining the operation of the Fig. 1 circuit.
Fig. 3 is a circuit equivalent used as an aid in describing the operation of the complete preselector included in the converter.
Fig. 4 is an electrical circuit diagram of the two tuning line circuits included in the preselector stage.

The novel converter unit in accordance with the invention comprises the following major units, all as shown in U. S. Patent 2,763,776, to which reference is made for a description of the entire unit: First, a double-tuned bandpass preselector circuit comprising the tuning lines 20 and 21 and immediately associated components; second, a crystal mixer diode to which the selected radio frequency carrier signals are applied; third, a local oscillator comprising a vacuum tube, a tuning line and associated components for generating local oscillations which are also applied to the crystal mixer to convert, by heterodyne action, the carrier frequency signals into intermediate frequency signals; fourth, a low noise stage of first I. F. power amplification comprising a vacuum tube and associated circuit elements; fifth, a power supply in the form of a half-wave rectifier and functioning as a source of heater and space currents; and sixth, a ganged pair of control switches manually operable to condition the receiver for ultra-high-frequency operation (U. H. F.) or very-high-frequency operation (V. H. F.).

A suitable U. H. F. antenna is connected to antenna input terminals 29 and 30, which are in turn connected by conductors 32 and 33 to the primary of an antenna input transformer, which primary comprises a loop of conductive material 34, one terminal of which is grounded at 35. The first preselector circuit comprises a parallel-conductor type of tuning line 20 which is adjusted by a short-circuiting bar, indicated by the reference numeral 36, to produce parallel resonant conditions in the tuned circuit comprising tuning line 20, end inductor 37, trimmer capacitor 38, capacitor 39, and metallic plate 40. Plate 40 is a ribbon conductor which serves both as an inductor and as the fixed plate of a capacitor, in furtherance of the two functions of antenna coupling and coupling between the two circuits of the selector network. The closed end of transmission line 20 is grounded at 41, and the adjustable shorting bar is grounded at 42. One terminal of line 20 is connected to plate 40, and the other terminal is connected at point 43 to an adjustable end inductor 37. The remaining terminals of plate 40 and end inductor 37 are connected, respectively, to the high potential terminals of capacitor 39 and capacitor 38. Capacitor 38 is adjustable and is connected to ground at 44. The remaining terminal of capacitor 39 is grounded at 45. The antenna input primary 34 is coupled to the first preselector circuit, inclusive of the elements 39, 40, 20, 37, and 38, by the capacitive and mutually inductive relationship existing between loop 34 and plate 40.

The bandpass selector network in accordance with the invention includes a second tuned preselector circuit comprising tuning line 21 and associated circuit elements 46, 47, 48, 49, and 50. Line 21 is provided with an adjustable shorting bar 51. The closed end of the tuning line is grounded at 52. One terminal of the tuning line is connected to a terminal of capacitor 46. The other terminal of tuning line 21 is connected at 53 to adjustable end inductor 47. Capacitor 48 is connected between grounded point 54 and the remaining terminal of inductor 47. Capacitor 46 projects through the chassis and is connected to junction 55. Inductance 50 is connected between point 55 and ground, and capacitor 49 is also connected between point 55 and ground. Point 55 is the junction of capacitors 46 and 49 and inductance 50.

The first preselector circuit is coupled to the second preselector circuit by the capacitive and inductive, primarily the capacitive, relationships between plate 40 and plate 19, plate 19 being connected to the junction of capacitor 46 and tuning line 21.

The preselector output is taken from terminals 55 and 54 (ground), and the parallel combination of capacitor 49 and inductor 50 is connected across these terminals.

Having described our converter construction in detail, the description of the operation proceeds. The novel antenna coupling circuit is symbolically illustrated in Fig. 1 and represented by an equivalent circuit in Fig. 2. This circuit comprises a transformer having a primary 34 and a secondary 40, a tuning line 20, a fixed capacitor 39, an adjustable end inductance 37, and an adjustable trimmer capacitor 38. The elements 39, 40, 20, 37, and 38 are serially arranged in a closed loop. The antenna coupling transformer consists of the primary loop 34 and the secondary plate 40, these elements being small, rigid conductors positioned relative to each other with close tolerance by a molded piece of mica-filled phenolic or other suitable insulating material such as glass, for example. The low potential terminals of capacitors 39 and 38 are grounded to the chassis at 45 and 44. The closed end of tuning line 20 is grounded at 41.

Referring to the simplified equivalent circuit for the antenna coupling system shown in Fig. 2, the primary circuit comprises effective shunt capacitance and the self-inductance of the primary winding or loop 34, while a tuned effectively parallel resonant circuit is provided by the tuning line 20 and the elements 37, 38, and 39, these last three elements being included in the secondary circuit in order to compensate for normal production variations in the system.

Referring to Fig. 2, which is somewhat over-simplified in that it is representative of conditions occurring at one frequency, it will be seen that the primary circuit is broadly tuned. The secondary circuit is sharply tuned to the desired channel by the position of shorting bar 36. The two shorting bars are in fact mechanical contacts individually disposed on the ends of the insulating arms.

The secondary circuit is both capacitively and magnetically coupled to the primary circuit, capacitance being provided by the elements 34 and 40 and the dielectric therebetween, mutual inductive coupling being provided by the interlinking of the primary and secondary circuits occasioned by the close spacing between the elements 34 and 40.

Antenna coupling circuit alignment adjustments are provided as follows:

First, end inductance 37 is made of a stiff but bendable conductive material, so that its loop configuration can be predetermined at the factory;

Second, capacitor 38 is adjusted at the factory in conventional manner by a screw. The operator tunes the antenna coupling circuit to the desired channel by determining the position of shorting bar 36 on tuning line 20.

It has been shown that the ideal coefficient of coupling in a tunable band pass filter of the general character under consideration, utilizing lumped reactances and assuming over-coupling, would vary approximately as a linear function of the resonant frequency to which the filter is tuned in order to maintain an acceptably constant pass band. Those skilled in the art are aware that extreme difficulty is encountered in making the coefficient of coupling behave in this manner or in approaching such behavior. So far as we are aware, the present antenna input circuit represents the first provision of an antenna input circuit utilizing a tuning line in which the coefficient of coupling is controlled automatically to vary in such a manner as to maintain the pass band with commercially acceptable constancy.

It has further been shown, utilizing the notation of Terman and lump-constant circuit elements, that $$m=\frac{LC_1}{C_1+C_2}+\frac{M_2}{\left(\frac{\omega}{\omega_2}\right)^2-1}+\frac{LC_1}{C_1+C_2\left[\left(\frac{\omega}{\omega_2}\right)^2-1\right]}$$

where $L$=inductance of tuned secondary,
$L_2$=primary coil inductance,
$C_1$=capacitance of coupling capacitor,
$C_2$=capacity across input terminals,
$M_2$=mutual inductance between L and $L_2$,
$\omega_2$=resonant frequency of primary circuit,
$\omega$=operating frequency (dependent on adjustment of L and C).

The notation in this equation is that of Terman, pages 166, 167, Fig. 30(*b*), Radio Engineers Handbook, McGraw-Hill, New York, 1943.

The first term on the right-hand side of this equation, $C_1$ and $C_2$ being constant, shows that a component of $m$ is a linear function of L and therefore varies inversely as the square of the operating frequency. This component, considered alone, would decrease $m$ at an excessively rapid rate, narrowing the pass band at higher operating frequencies.

The second term on the right-hand side of this equation, $M_2$ being constant, has a negative value when $\omega$ is low compared to $\omega_2$, and a positive value when $\omega$ is high compared to $\omega_2$, showing that another component of $m$ tends to loosen the coupling and narrow the band width at low operating frequencies but to tighten the coupling and widen the pass band at higher frequencies. $\omega_2$ approximates 650 megacycles in the preferred embodiment.

The total coupling is limited by primary loading of equivalent resistance R approximating 150 ohms.

The third term varies from a negative value at low frequencies to a smaller positive value at high frequencies, but its effect is relatively insignificant.

The first two terms, taken together, provide values of effective coupling, $m$, throughout the operating range from 465 to 905 megacycles, which preserve an adequate band width.

Both first and second terms are frequency-dependent, but the effect of the second term is to slow down the rate at which $m$ would otherwise decrease with operating frequency increase, thereby preserving the desired band width.

It can also be shown that $$\omega_2^2=\frac{1}{L_2(C_1+C_2)(1-K_2^2)}$$

where $K_2$ is the coupling coefficient corresponding to $M_2$, the mutual inductance between L and $L_2$.

We make $\omega_2$ approximately equal to 650 megacycles when the secondary is tuned to the geometric mean of the range between 465 and 905 megacycles. It is essentially a fixed parameter, although it varies slightly with secondary tuning.

It will be appreciated that the term $\omega$ is functionally dependent on the capacitance in shunt with the secondary and also the inductance of the secondary, these parameters varying in a known manner as the tuning line length is adjusted by the short-circuiting bar 36.

The closed end of tuning line 20 is grounded at 41 and the shorting bar is grounded at 42 in order to prevent the line from functioning as a radiator of oscillator voltages and also to permit the use of a relatively short tuning line.

The section of the tuning line 20 between shorting bar 36 and its closed end, together with the ground connections 41 and 42, is utilized in a particularly advantageous manner to reduce radiated oscillator voltage. So far as driving of the antenna by such voltages is concerned, the Q of the antenna circuit is radically decreased by the loading provided by this normally unused portion of the transmission line, which loading is equivalent to that which would theoretically be provided by two heavily loaded circuits coupled to the source of such voltage. Additionally, these ground connections and the normally unused portion of the line load the end of the line and permit the use of lines having a length of considerably less than a quarter wave length.

The novel preselector circuit is symbolically illustrated in Fig. 4. It comprises tuning lines 20 and 21. Tuning line 21 is provided with a shorting bar 51 and the closed end of the line is grounded at 52. Connected in series between one terminal 53 of the tuning line and ground 54 are an adjustable end inductor 47 and an adjustable trimmer capacitor 48. Connected in series between the other terminal of the tuning line and ground are a fixed capacitor 46 and a parallel combination of a fixed capacitor 49 and a fixed inductance 50. Said other tuning line terminal is also connected to a metallic plate 19. The preselector circuit also comprises tuning line 20, adjustable end inductance 37, trimmer capacitor 38, and fixed capacitor 39, hereinabove described in detail.

Metallic plates 40 and 19 constitute a capacitor for coupling one of the tuning line circuits to the other. End inductance 47, like inductance 37, is adjusted by bending. Capacitor 48 is adjusted by a screw. The capacitance provided by plates 19, 40 is also adjustable by a screw.

Again the ideal coefficient of coupling in a preselector circuit of the general character herein considered, would vary approximately as a linear function of the resonant frequency to which the preselector is tuned in order to maintain an acceptably constant pass band. So far as we are aware, the present preselector circuit is fundamentally novel and represents the first utilization of two tuning lines and means intercoupling them in such a way that the coefficient of coupling is controlled automatically to vary in such a manner as to maintain a commercially workable pass band. It has been shown by analogous reasoning, utilizing lumped parameters, that the effective coupling $$m=\frac{LC_1}{(C_1+C_2)}+\frac{\frac{LC_1}{(C_1+C_2)}}{\left(\frac{\omega}{\omega_2}\right)^2-1}$$

and that $$\omega_2^2=\frac{1}{L_2(C_1+C_2)}$$

when L is a secondary self-inductance, $C_1$ is the coupling capacitance, $C_2$ is the primary circuit capacitance, $L_2$ is the primary circuit self-inductance, and C is the secondary circuit capacitance. Referring now to the first of these equations, the first term represents a component of coupling which decreases at an excessively rapid rate with increase in operating frequency, thereby tending to narrow the pass band at the upper end of the tuning range. On the other hand, the second term on the right-hand side of the first equation represents a component of coupling which is negative and tends to broaden the pass band when $\omega$ is low with respect to $\omega_2$, but is positive and tends to tighten the coupling when $\omega$ is high with respect to $\omega_2$, $\omega$ representing the operating frequency and $\omega_2$ representing the resonant frequency of the primary circuit. The circuits are so arranged that $\omega$ is greater than $\omega_2$, whereby the fraction $$\frac{\omega}{\omega_2}$$

decreases with increasing frequency. The significance of this is that the component of coupling which tends to tighten the coupling increases with increasing frequency, the denmoinator in the second term on the right-hand side of the equation approaching zero as the frequencies are increased. $\omega_2$ is therefore established higher than $\omega$. The coupling is adjusted at the factory for the desired maximum band width at a frequency of 700 megacycles, for example. The above-discussed second term, together with the first term, provides values of effective coupling, $m$, throughout the operating range from 465 to 905 megacycles, thereby preserving an adequate band width. Both first and second terms of the equation are frequency-dependent, but the effect of the second term is to slow down the rate at which $m$ would otherwise decrease with operating frequency increase, thereby preserving the desired band width. The term $\omega$ is functionally dependent on the inductance and capacitance of the secondary, these parameters varying in known manner as the tuning line length is adjusted by the short-circuiting bar 51, bars 51 and 36 being ganged for unicontrol.

Crosley V. H. F. tuners of the type suitable for use in conjunction with this converter are shown in the following patents of Emmery J. H. Bussard, assigned to the same assignee as the present application and invention (to wit, Avco Manufacturing Corporation): U. S. Patent 2,652,487, "Constant Band Width Coupling Circuit for Television Receiver Tuners," and U. S. Patents 2,615,983, 2,579,789 and 2,711,477, each entitled "Tuner for Television Receivers."

The combination 49, 50, considered alone, is desirably resonant at approximately 310 megacycles. This combination serves two useful purposes: (1) It attenuates oscillator voltages tending to radiate from the antenna, because it serves as an effective short circuit to such voltages, looking from the oscillator into the terminals 55, 54; (2) the signal coupling into the mixer provided by the preselector and this parallel capacitor 49—inductor 50 combination varies automatically with preselector tuning in such a manner as to compensate for the normal decrease in gain which accompanies an increase in signal frequency. The elements 49 and 50 are preferably designed, in conjunction with the preselector, for maximum power transfer of the carrier signals to the mixer. These elements terminate tuning line 21 in such a manner as to provide a proper coupling to a diode mixer.

The mixer and associated circuit elements accomplish in a novel manner the basic functions required of a frequency converter stage in a superheterodyne receiver, to wit: First, the beating of the local oscillator frequency against the input carrier frequency to produce the desired difference frequency output; second, the presentation of a low input impedance to intermediate frequencies; third, the presentation of a high input impedance at the mixer to R. F. carrier frequencies and local oscillations; fourth, the rejection of sum frequencies and input frequency components in the mixer output system; fifth, the rejection of image frequencies and undesired carrier frequencies preparatory to application of signals to the mixer.

In the present invention considerable image frequency rejection and very effective selection of the carrier frequency signals in the desired channel are accomplished before application of carrier signals to the mixer, as indicated above. The mixer input circuit, including resonant line 21, is essentially a selective network tuned to the desired carrier signal channel. This network comprises the parameters $L_1$ and $C_1$ (reference is to Fig. 20 of U. S. Patent 2,763,776) provided by the resonant line 21, the series capacitors 46 and 48, and the combination of parallel capacitance 49 and inductance 50. By reason of the adjustment of shorting bar 51 to select the desired channel, the entire network comprising capacitors 46, 49, 48, $C_1$, and inductors $L_1$ and 50 is tuned to the carrier signal frequency. This entire network may be reduced to a simple parallel resonant circuit, comprising lumped inductance and capacitance, which presents a high impedance to the carrier frequency signals, thereby applying them strongly to the crystal mixer. The network comprising the elements $L_1$, $C_1$, 46, 48, 49, and 50 "looks like" (see Fig. 20 and page 15, line 15 of U. S. Patent 2,763,776) a large net capacitive reactance to oscillator voltages, again recalling that the local oscillation frequency is lower than the corresponding selected channel frequency. It will be seen, therefore, that the crystal mixer excitation circuit "looks like" a relatively high impedance to both radio frequency carrier and oscillator output signals. On the other hand, this network "looks like" a very low impedance to input signals of frequencies on the order of the first intermediate frequency and strongly attenuates or discriminates against such input signals of that frequency so far as application to the crystal is concerned, the total impedance to the first intermediate frequency signals being in effect provided by the relatively low inductive reactance 50 so far as the input circuit is concerned. This low impedance presented to intermediate frequency signals improves the already excellent intermediate frequency rejection provided by the preselector circuits. The mixer is effectively tapped down on the preselector circuit to prevent unduly large loading, by reason of the connection of the mixer across capacitor 49 only of the voltage divider comprising capacitors 46, 49, and 48. The capacitors 46 and 48 accordingly prevent unduly large loading of the mixer by the preselector. Capacitor 48 effectively isolates the high impedance end of the preselector from ground, thereby facilitating tuning through the upper portion of the range. The combination of capacitance 49 and inductance 50, as stated above, must resonate below the low frequency end of the range and preferably at 310 megacycles. Inductance 50 also serves as a direct current return for the crystal current. The capacitors 46, 49, and 48 also provide some tuning capacity which constitutes the means for loading of the preselector by the mixer. Neither of the terminals of line 21 can be directly grounded without introducing undesired discontinuities into the tuning characteristic of the converter, and grounding of such a terminal would cause the shorting bar to have little or no effect on the resonant frequency at the upper end of the range. This condition is eliminated by the provision of the capacitors 46, 48, and 49.

While we do not desire to be limited to a single set of circuit parameters, the following illustrative parameters have been found to be satisfactory in one successful embodiment of the invention:

| | |
|---|---|
| Capacitor **39** | 1.5 micromicroforads. |
| Capacitor **38** | .8–6.5 micromicroforads, variable. |
| Capacitor **19** | .1–5 micromicrofarad, variable. |
| Capacitor **34**, **40** | 1.5 micromicrofarads. |
| Capacitor **46** | 2.2 micromicrofarads. |
| Capacitor **48** | .8–6.5 micromicrofarads, variable. |
| Capacitor **49** | 5 micromicrofarads. |
| Inductance **37** | .002–.0045 microhenry self-inductance, variable. |
| Inductance **47** | .002–.0045 microhenry self-inductance, variable. |
| Inductance **50** | .05 microhenry self-inductance. |
| Preselector tuners: | |
| Distributed capacitance— | |
| Mixer | 2.0 micromicrofarads. |
| Antenna | 1.7 micromicrofarads. |
| Maximum inductance— | |
| Mixer | .0654 microhenry. |
| Antenna | .0606 microhenry. |
| Minimum inductance— | |
| Mixer | .0314 microhenry. |
| Antenna | .0323 microhenry. |
| Converter range | 465 to 902 megacycles. |
| First intermediate frequency | 127.5 megacycles. |
| Over-all gain of converter | 1.2–2.0. |
| Resonance frequencies: | |
| Elements **49**, **50** | 310 megacycles. |
| Input impedance of V. H. F. Receiver | 150 ohms, approximately. |
| Impedance of U. H. F. antenna | 150 ohms, approximately. |

While there has been shown and described what is at present considered to be the preferred embodiment of the invention, it will be understood by those skilled in the art that various modifications and changes and substitutions of equivalents may be made therein within the true scope of the invention as defined by the appended claims.

Having fully disclosed and described our invention, we claim:

1. In a U. H. F. converter for a television receiver an antenna coupling circuit comprising a transformer having a single-loop primary and a coupling plate constituting a secondary, said primary and its effective shunt capacitance comprising a broadly tuned primary circuit, a fixed capacitor and a tuning line and adjustable lumped inductance and an adjustable trimmer capacitor serially arranged in a closed loop with said coupling plate to provide a tuned secondary circuit capacitively and inductively coupled to said primary circuit, said tuning line comprising a pair of ribbon-like spaced conductors.

2. In a U. H. F. converter ror a television receiver an antenna coupling circuit comprising a pair of antenna input terminals, a single primary coupling loop connected between said terminals, a ground connection to one of said terminals, a conductive metallic plate spaced from and coupled to said loop, an adjustably short circuited parallel-wire tuning line comprising a pair of ribbon-like conductors and having two input terminals of which one is connected to said plate, an adjustable end inductance connected to the other terminal of said line, a fixed capacitor between said plate and ground and a trimmer capacitor between sid end inductance and ground.

3. An antenna input and preselector circuit comprising a transformer having a single-loop primary circuit and a coupling plate constituting a secondary, a tunable secondary loop circuit including a parallel conductor tuning line and said coupling plate, said tuning line having two terminals, one of which is connected to said coupling plate, said secondary circuit being magnetically and electrostatically coupled to said primary circuit, a second parallel conductor tuning line having two terminals, unicontrol means for adjustably short-circuiting both of said lines, individual adjustable end inductances in series with and connected to the remaining terminal of the first-mentioned line and the corresponding terminal of said second line, respectively, individual trimmer capacitors in series with said inductances and connected between said inductances and a plane of reference potential, individual fixed capacitors connected in series between said plane of reference potential and said coupling plate and between said plane and the other terminal of said second tuning line, respectively, and means for intercoupling said lines comprising a capacitor plate spaced from said coupling plate and connected to the junction of the second turning line and its associated fixed capacitor, the above-mentioned secondary loop circuit including, in series, one of said fixed capacitors and said coupling plate and the first-mentioned parallel conductor tuning line and one of said adjustable end inductances and one of said timmer capacitors.

References Cited in the file of this patent

UNITED STATES PATENTS

| | | |
|---|---|---|
| 2,151,081 | Carlson et al. | Mar. 21, 1939 |
| 2,226,694 | Buschbeck | Dec. 31, 1940 |
| 2,234,584 | Trevor et al. | Mar. 11, 1941 |
| 2,257,274 | Rahn | Sept. 30, 1941 |
| 2,439,245 | Dunn | Apr. 6, 1948 |
| 2,452,916 | Fleischmann | Nov. 2, 1948 |
| 2,504,603 | Storm | Apr. 18, 1950 |
| 2,513,761 | Tyson | July 4, 1950 |
| 2,522,035 | Gusdorf et al. | Sept. 12, 1950 |
| 2,551,228 | Achenbach | May 1, 1951 |
| 2,576,836 | Hilsinger | Nov. 27, 1951 |
| 2,627,579 | Wasmansdorff | Feb. 3, 1953 |
| 2,656,517 | Johnson | Oct. 20, 1953 |
| 2,772,355 | Deutsch et al. | Nov. 27, 1956 |
| 2,787,705 | Rubin | Apr. 2, 1957 |

UNITED STATES PATENT OFFICE
CERTIFICATE OF CORRECTION

Patent No. 2,843,828 July 15, 1958

Emmery J. H. Bussard et al.

It is hereby certified that error appears in the printed specification of the above numbered patent requiring correction and that the said Letters Patent should read as corrected below.

Column 6, line 46, for "voltage" read --voltages--; column 7, line 41, for "denmoinator" read --denominator--; column 9, line 17, for ".1-5" read --.1-.5--; column 10, line 16, for "sid" read --said--; line 38, for "turning" read --tuning--; line 43, for "timmer" read --trimmer--.

Signed and sealed this 14th day of October 1958.

(SEAL)
Attest:
KARL H. AXLINE
Attesting Officer

ROBERT C. WATSON
Commissioner of Patents